United States Patent Office 2,862,032
Patented Nov. 25, 1958

2,862,032

PREPARATION OF VITAMIN A INTERMEDIATES

Howard C. Klein, Brooklyn, N. Y., assignor to Nopco Chemical Company, Harrison, N. J., a corporation of New Jersey No Drawing. Application February 5, 1958
Serial No. 713,286

13 Claims. (Cl. 260—563)

The present invention relates to the preparation of vitamin A intermediates. More particularly the present invention relates to the preparation of a vitamin A active organic nitrogen compound and vitamin A aldehyde.

The synthesis of vitamin A has engaged the attention of the art since the structure of vitamin A was first disclosed by Karrer in 1933. Many routes for the synthesis of vitamin A have been advanced and a considerable body of literature has been developed concerning the preparation of vitamin A and vitamin A intermediates. Because of the demand for vitamin A and the market which exists for this compound efforts are constantly being directed towards new and improved methods for both the total synthesis of vitamin A and for the preparation of intermediate compounds which can be employed in the production of vitamin A.

Accordingly, it is an object of the present invention to provide a novel method for obtaining a vitamin A active nitrogen containing intermediate free of anhydro vitamin A.

A further object is to obtain vitamin A aldehyde in increased yields and in increased purity.

A still further object is to obtain vitamin A aldehyde free from anhydro vitamin A, an undesirable material having no vitamin A activity.

Other objects will become apparent from the detailed description given hereinafter. It is intended, however, that the detailed description and specific examples are not limiting, but merely indicate the preferred embodiments thereof since various changes and modifications within the scope of the invention will become apparent to those skilled in the art.

The vitamin A active nitrogen containing intermediate as well as two methods for its preparation making use of a boron trifluoride hexamethylene tetramine complex are described in U. S. Patent No. 2,819,310, Klein, Beckmann and Schaaf, and U. S. Patent No. 2,819,308, Schaaf, Klein and Kapp, both issued on January 7, 1958. This compound is referred to hereinafter as Compound IV.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure as vitamin A only the amine group has replaced the hydroxyl group of vitamin A. The 9.6% value is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicate that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet region of the spectrum at 3250 A. and has at that wave length an extinction coefficient $(E_{1 \text{cm.}}^{1\%})$ of about 1000

If it is treated with hydrobromic acid, a product is obtained which has an absorption maximum at 3300 A. Likewise, treatment of Compound IV with phosphoric acid gives a product having an absorption maximum at 3280–3300 A. Presumably salts of Compound IV are formed by treatment with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

Compound IV can be converted to vitamin A amine by treating it with aluminum isopropoxide in accordance with the procedure disclosed and claimed in U. S. Patent No. 2,819,309, Klein, issued on January 7, 1958. Also, Compound IV can be converted into vitamin A aldehyde by treating it with iodine in accordance with the procedure disclosed and claimed in U. S. Patent No. 2,819,311, Klein and Grassetti, issued on January 7, 1958.

The above and other objects are achieved by reacting the cis or trans isomer of

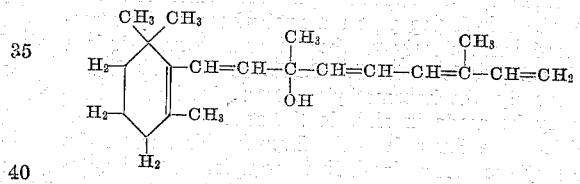

referred to hereinafter as Compound I with a complex formed from hexamethylene tetramine and iodine and thereafter working up the reaction mixture with an alkaline material. The resulting product is Compound IV. Alternatively, the reaction mixture without workup may be treated with water or the reaction product may be isolated and treated with water. In this manner, vitamin A aldehyde is obtained.

This reaction is most surprising since an exhaustive search for other complexes of hexamethylene tetramine that would serve effectively in the preparation of Compound IV from Compound I, was unsuccessful. For instance, where the boron trifluoride moiety of the hexamethylene tetramine complex as described in the aforementioned patents was replaced by acids such as citric acid, acetic acid, phosphoric acid, etc., the primary reaction product was found to be anhydro vitamin A. Even the employment of a complex containing one mol of hexamethylene tetramine and one mol of iodine in admixture with one mol of Compound I yielded primarily unreacted starting material and on longer reaction periods (i. e., 72 hours), gave mostly anhydro vitamin A and polymeric material. Attempts to use two moles of this same complex with one mol of Compound I gave principally polymeric material after 150 hours reaction time. Thus, I have found that a complex containing a ratio of the two mols of iodine per one mol of hexamethylene tetramine has been found to be critical. Moreover, if catalytic amounts even up to 0.1 mole of my hexamethylene tetramine-iodine complex per mol of Compound I are employed, no substantially useful products are obtained since the principal product is also anhydro vitamin A. Thus, also I have found that it is necessary to use approximately equimolecular quantities of my complex with Compound I.

The discovery that my hexamethylene tetramine-iodine complex may be successfully employed offers many new and unexpected advantages. The hexamethylene tetramine-iodine complex may be conveniently stored at room temperature without any deleterious effects. In contradistinction to this, not only is the boron trifluoride complex hygroscopic but once it has absorbed moisture it is rendered useless. Attempts to redry such material by all normal techniques, results in a new material which will no longer serve in the conversion of Compound I to Compound IV. This is indeed an anomalous situation since the reaction of Compound I with boron trifluoride hexamethylene tetramine complex may be carried out in the presence of water. Moreover, I have found that the incorporation of iodine into the reaction system by means of my complex results in a product which is free of anhydro vitamin A.

The hexamethylene tetramine-iodine complex which contains two molecules of iodine per molecule of hexamethylene tetramine was prepared as follows. 14.0 grams of hexamethylene tetramine were dissolved in 200 ml. of ethanol. To the solution, while stirring, 33.0 grams of iodine dissolved in 300 ml. of ethanol were added dropwise over a period of one hour while the temperature was maintained at 15° C. After stirring for an additional hour, the mixture was filtered and washed with cold methanol, followed by water. A yellow-green precipitate was obtained, whose analysis corresponded most closely to hexamethylene tetramine.$I_2$ as determined by iodine analysis. The filtrate and washings were then combined and further material precipitated therefrom. This precipitate was filtered and the resulting orange crystals washed with cold water and cold methanol. Air-drying gave material whose analysis corresponded most closely to the formula, hexamethylene tetramine.$2I_2$ (calc'd. for I: 78.5%, found: 75.2%).

Alternately, the hexamethylene tetramine-iodine complex may be made in situ, in the reaction with Compound I. (See Example III.) Even in this manner the hexamethylene tetramine-iodine complex is advantageous, since two solids viz., hexamethylene tetramine and iodine are being handled. On the other hand, boron trifluoride is a gas and cannot conveniently be used to prepare a boron trifluoride hexamethylene tetramine complex in situ.

Compond I is characterized by having the empirical formula $C_{20}H_{30}O$, by containing the beta ionone ring structure, four ethylenic bonds and one hydroxyl group. The trans configuration has an ultra-violet absorption maximum at 2710 A., a molecular extinction coefficient at that wave length of 29,100 and a refractive index at 20° C. of about 1.552. The cis configuration has an ultra-violet absorption maximum at 2740 A., a molecular extinction coefficient at that wave length of 25,900 and a refractive index at 16° C. of about 1.535. The preparation of both the cis and trans isomers of Compound I is described in U. S. Patent No. 2,819,308, Schaaf, Klein and Kapp, issued on January 7, 1958.

As regards Compound I, obviously either the cis or trans configurations may be successfully used in order to obtain Compound IV or vitamin A aldehyde, because the double bond which is responsible for the two isomers or configurations is destroyed in the reaction and is replaced by a single bond about which there is free rotation. Hence, the reaction conditions described for conversion of the trans isomer of Compound I to Compound IV equally applies to the cis isomer of Compound I.

The temperature at which the reaction is carried out may be varied. Preferably, the temperature should be between about room temperature and about 35° C.; however, if desired either higher or lower temperatures can be employed. At room temperature the reaction will normally proceed to completion in not more than about three hours and in many instances will be completed in from fifteen to thirty minutes.

The preferred solvent is dioxane containing a small amount of water since the presence of water promotes the desired reaction and permits it to proceed at a practical rate. Thus from about 1% to 10% of water based upon the volume of the dioxane is used. Also, water is used in the reaction medium when aromatic hydrocarbon solvents are used such as benzene, toluene, xylene, methyl isopropyl benzene, ethyl benzene, diethyl benzene, mesitlyene, butyl benzene, amyl benzene, etc. The hydrocarbon solvents are substantially water immiscible but they will dissolve a small percentage of water. When these aromatic solvents are used, it is preferred to use from at least about one mol of water for each 5 mols of Compound I to not more than about 4 mols of water per mol of Compound I. Even more useful solvents are the more polar solvents such as acetone, acetonitrile, acrylonitrile, benzyl cyanide, isopropenyl acetate and tetrahydrofuran. With these particular solvents the use of water is optional.

When the reaction product which is formed by treatment of Compound I with a complex of hexamethylene tetramine and two mols of iodine in the general manner described, is to be subsequently treated with water to effect its conversion to vitamin A aldehyde without isolating it from its reaction mixture, it is preferred to select a solvent that will form a homogeneous system. Examples of suitable solvents are acetone, acetonitrile, dioxane and mixtures of such solvents.

Preferably rather dilute solutions of Compound I and the hexamethylene tetramine-iodine complex are used. In most cases a concentration of from about 0.1 gram to about 1.0 gram of Compound I is present for each 100 ml. of solution.

To recover Compound IV after reactcion is complete, an organic or inorganic basic material in an amount sufficient to react with all of the reactcion product formed by interaction of Compound I and the hexamethylene tetramine-iodine complex in the reaction mixture is added. Thus, the basic material which is added separates the product produced by the reaction of Compound I with the hexamethylene tetramine-iodine complex. The basic material can be added as an aqueous solution or as an alcoholic solution or by any other suitable means. Bases such as ammonia, sodium hydroxide, potassium hydroxide, trimethylamine, ethanolamine and similar bases may be employed. The type or nature of the basic material which is added is not critical except that it must be capable of liberating Compound IV from the reaction medium and must not destroy either the starting material (Compound I), or the product.

After the treatment of the reaction mixture with the basic material, Compound IV is present in the reaction mixture essentially free of iodine. Final traces of free iodine are removed by shaking the organic extracts with aqueous $Na_2S_2O_3$. Compound IV may then be readily recovered from the reaction mixture by any suitable means. For example, if the basic material was added in an aqueous solution, extraction of the reaction mixture with hexane will remove Compound IV from the reaction mixture in essentially pure form. Compound IV can then be obtained by evaporation of the hexane extracts.

The following describes the general procedure for obtaining vitamin A aldehyde from (a) the untreated reaction mixture (without work up with a base and subsequent recovery of Compound IV) and (b) Compound IV. Preferably, water is added to the reaction product which has not been isolated but remains in situ in its own reaction mixture which serves as the solvent therefor. It is added in an amount of at least 15% to 30% by volume of the total reaction mixture present. The solvent may be almost any common inert organic solvent, such as ethanol, acetone, acetonitrile dioxane, their mixtures, etc., i. e., preferably a solvent which renders the reaction mixture homogeneous. Some water may already be present in conjunction with the dioxane or with the aromatic solvent. The preferred amounts of water are from about 20% to 30% by volume of the total reaction mixture present including the solvent. Hence, it can be seen that the quantity of water which will be added will vary depending upon the quantity of water that may already be present from the reaction of Compound I and hexamethylene tetramine-iodine complex. Water may also be added to Compound IV which has been previously isolated and dissolved in a water-miscible solvent such as dioxane. The quantity of water is the same as that indicated previously when the reaction mixture is being treated. Likewise, the total amount of solvent is the same in either case, i. e., there is present from about 0.1 to 1.5 grams of reaction material per 100 ml. of total solution. Preferably 1 to 1.5 grams are present.

When carrying out the reaction with water to obtain the aldehyde, the reaction mixture is heated preferably at the temperature of reflux of the mixture. However, a temperature range of from about 70° C. up to reflux may be used. Only a short time is necessary for heating, usually from about 15 minutes to an hour is ample to bring about formation of vitamin A aldehyde.

For a fuller understanding of the nature and objects of this invention, reference may be had to the following examples which are given merely for purposes of illustrations and are not to be construed in a limiting sense.

*Example I*

50 mg. of the trans isomer of Compound I were dissolved in 10 ml. of dioxane. To this solution were added 115 mg. of hexamethylene tetramine-iodine complex dissolved in 5.0 ml. dioxane and 0.25 ml. of water. The aforementioned complex contained 1 mol of hexamethylene per 2 mols of iodine. The resulting reaction mixture of Compound I and hexamethylene tetramine-iodine complex was allowed to stand at room temperature for 1 hour. Thereafter it was worked up in the following manner. The reaction mixture was poured into a mixture of 30 ml. of 10% aqueous potassium hydroxide solution, 30 ml. of water and 30 ml. of hexane. The aqueous phase was drawn off and re-extracted with 30 ml. of hexane. The hexane extracts were combined and washed with saturated sodium chloride three times, once with a 5% aqueous thiosulphate solution and three times with a saturated sodium chloride solution and finally dried over sodium sulphate, filtered and evaporated.

In this manner a 38% yield of Compound IV was obtained. This compound has a λ max.=3260 A. and it was found to be free of anhydro vitamin A.

*Example II*

50 mg. of the trans isomer of Compound I were dissolved in 10 ml. of dioxane. To this solution 115 mg. of hexamethylene tetramine-iodine complex dissolved in 5.0 ml. dioxane and 0.25 ml. of water were added. The aforementioned complex contained 1 mol of hexamethylene tetramine per each 2 mols of iodine. The resulting reaction mixture of Compound I and hexamethylene tetramine iodine complex was allowed to stand at room temperature for 3 hours. The reaction mixture was worked up in the same manner as indicated in Example I. In this manner, a 19% yield of Compound IV, free of anhydro vitamin A, was obtained.

The following example is directed to the production of vitamin A aldehyde by treating the reaction product of Compound I and hexamethylene tetramine-iodine complex with water in situ.

*Example III*

49.2 mg. of hexamethylene tetramine and 177.8 mg. of iodine were placed in a reaction flask. Then 0.5 ml. of water and 16.8 ml. of dioxane were added, thereby forming a hexamethylene tetramine-iodine complex containing two molecules of iodine per molecule of hexamethylene tetramine. To the above solution, 101 mg. of the trans isomer of Compound I dissolved in 13.2 ml. of dioxane were added. The resulting solution was allowed to stand for one-half hour and then 55 ml. of water were added. This reaction mixture was then refluxed for one-half hour. Upon conclusion of the refluxing, the reaction mixture was treated with a 10% aqueous solution of sodium thiosulfate until the iodine color was discharged. Extraction of the product with hexane was carried out and the product analyzed spectrographically. An ultra-violet absorption maximum at 3720 A. was observed which indicated the presence of vitamin A aldehyde. There was no indication of the presence of anhydro vitamin A. The net yield of vitamin A aldehyde was 42%.

Hence, it can be seen that a novel process has been described in which Compound I may be successfully employed to produce Compound IV as well as vitamin A aldehyde in good yields and free from anhydro vitamin A.

Having thus described my invention, what I claim as new and desire to secure by Letters Patent is:

1. A process for obtaining a vitamin A active material which comprises reacting about 1 mol of a hexamethylene tetramine-iodine complex containing 2 mols of iodine per mol of hexamethylene tetramine at between room temperature and 35° C. and in the presence of a solvent with about 1 mol of a compound having the formula

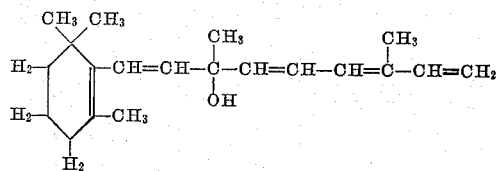

adding to the resulting reaction mixture an amount of an alkaline material sufficient to liberate said vitamin A active material from the reaction medium of hexamethylene tetramine-iodine complex and said compound and thereafter recovering said vitamin A active material.

2. The process of claim 1 in which said solvent is selected from the group consisting of water containing aromatic hydrocarbons, acetone, acetonitrile, acrylonitrile, benzyl cyanide, dioxane, isopropenyl acetate, tetrahydrofuran and the mixtures thereof.

3. The process of claim 2 in which said reaction is carried out for from about 15 minutes to 3 hours.

4. The process of claim 3 in which said solvent comprises dioxane containing from about 1 to 10% of water based upon the volume of said dioxane.

5. The process of claim 3 in which said

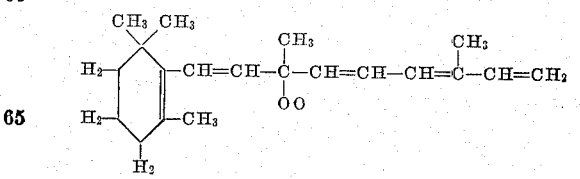

is present in an amount of from 0.1 to 1.0 gram for each 100 ml. of solution.

6. A process for obtaining vitamin A aldehyde free from anhydro vitamin A which comprises reacting about one mol of a hexamethylene tetramine-iodine complex containing 2 mols of iodine per mol of hexamethylene tetramine at between room temperature and 35° C. and in the presence of a solvent with about one mol of

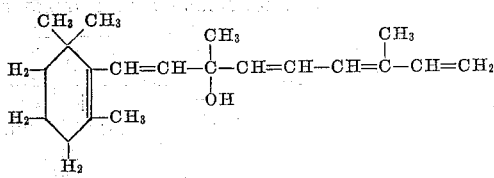

and thereafter reacting the resulting reaction product with water.

7. A process for obtaining vitamin A aldehyde free from anhydro vitamin A which comprises reacting about one mol of a hexamethylene tetramine-iodine complex containing 2 mols of iodine per mol of hexamethylene tetramine at between room temperature and 35° C. and in the presence of a solvent with about one mol of

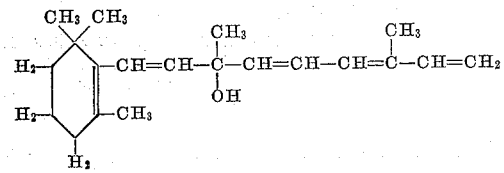

and thereafter reacting the resulting reaction product with water at a temperature of from about 70° C. up to the reflux temperature of the reaction mixture.

8. The process of claim 7 in which said reaction with water is carried out from about 15 minutes to about 1 hour.

9. The process of claim 8 in which said reaction with water is carried out at the reflux temperature of the reaction mixture.

10. The process of claim 8 in which said solvent is dioxane.

11. The process of claim 8 in which water comprises from about 15% to 30% by volume of the total reaction mixture.

12. The process of claim 8 in which said reaction product is present in an amount of from about 0.1 to 1.5 grams per 100 ml. of total solution.

13. A process for obtaining vitamin A aldehyde free from anhydro vitamin A which comprises reacting about one mol of a hexamethylene tetramine-iodine complex containing 2 mols of iodine per mol of hexamethylene tetramine at between room temperature and 35° C. and in the presence of a solvent with about one mol of

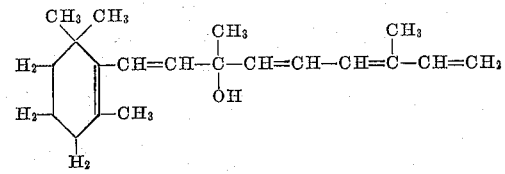

adding to the resulting reaction mixture an amount of an alkaline material sufficient to liberate vitamin A active material from the reaction medium of hexamethylene tetramine-iodine complex and said compound and thereafter reacting said vitamin A active material with water at a temperature of from about 70° C. up to the temperature of reflux of the material.

No references cited.